United States Patent [19]

Pfoehler et al.

[11] Patent Number: 4,937,282

[45] Date of Patent: Jun. 26, 1990

[54] DISPERSIONS OF NON-TERTIARY BUTYL (METH)ACRYLATE COPOLYMERS HAVING GLASS TRANSITION TEMPERATURES OF LESS THAN—10 °C.

[75] Inventors: Peter Pfoehler, Speyer; Hermann Seyffer, Heidelberg; Juergen Vietmeter, Wachenheim; Johannes Tuerk, Boehl-Iggelheim; Wolfgang Druschke, Dirmstein; Klaus Schagerer, Gruenstadt, all of Fed. Rep. of Germany

[73] Assignee: BASF Aktiengesellschaft, Ludwigshafen, Fed. Rep. of Germany

[21] Appl. No.: 359,975

[22] Filed: Jun. 1, 1989

[30] Foreign Application Priority Data

Jun. 3, 1988 [DE] Fed. Rep. of Germany ....... 3818869

[51] Int. Cl.$^5$ .............................................. C08L 35/06
[52] U.S. Cl. .................................... 524/820; 524/824; 524/831; 524/833
[58] Field of Search ............... 524/820, 824, 831, 833, 524/521, 523, 524

[56] References Cited

U.S. PATENT DOCUMENTS 4,371,659  2/1983  Druschke et al. ................... 524/831
4,397,984  8/1983  Wendel et al. ....................... 524/831

FOREIGN PATENT DOCUMENTS 2459160  8/1978  Fed. Rep. of Germany.
940366  10/1963  United Kingdom.

Primary Examiner—Joseph L. Schofer
Assistant Examiner—Jeffrey T. Smith
Attorney, Agent, or Firm—Oblon, Spivak, McClelland, Maier & Neustadt

[57] ABSTRACT

Aqueous dispersions of copolymers of
  (a) from 70 to 85% by weight of nontertiary butyl (meth)acrylates,
  (b) from 8 to 27.2% by weight of (meth)acrylates (A) whose homopolymers have a glass transition temperature greater than that of the polybutyl (meth)acrylate up to 0° C. and (meth)acrylates (B) whose homopolymers have a glass transition temperature below that of the polybutyl (meth)acrylate, the weight ratio of the (meth)acrylates (A) to the (meth)acrylates (B) being from 3:1 to 1:3,
  (c) from 2 to 15% by weight of methyl methacrylate, styrene and/or acrylonitrile and
  (d) 0.8 to 5% by weight of monoolefinically unsaturated mono- and/or dicarboxylic acids of 3 to 5 carbon atoms and/or their amides which are unsubstituted or substituted at the nitrogen atoms by alkyl and/or alkylol radicals of 1 to 4 carbon atoms and/or hydroxyalkyl (meth)acrylates where the alkyl groups are of 2 to 5 carbon atoms,
are used for coating sheet-like substrates.

2 Claims, No Drawings

DISPERSIONS OF NON-TERTIARY BUTYL (METH)ACRYLATE COPOLYMERS HAVING GLASS TRANSITION TEMPERATURES OF LESS THAN − 10° C.

Contact adhesives consisting of synthetic raw materials are increasingly being used for the production of self-adhesive articles. Paper and metal foils and films of polyethylene, polypropylene, polyethylene glycol terephthalate or PVC are among the materials which are suitable as substrates for the production of such self-adhesive articles.

Contact adhesive solutions which are based on natural or synthetic rubber, which are modified with soft resins and/or plasticizers and which form a soft, highly tacky film have generally been used to date in practice for the production of self-adhesive articles for use on polyyolefinic surfaces. For example, gasoline, toluene, acetone and/or ethyl acetate are used as solvents. The preparation of such adhesive solutions based on rubber is technically complicated since, for example, the natural rubber components have to be masticated on roll mills or kneaders and the elastomers have to be dissolved in the organic solvents using dissolver-kneaders or dissolvers. Furthermore, these are flammable solvents, necessitating explosion-proof coating plants and solvent recovery plants when the adhesive solutions are used. Other disadvantages of these adhesives are their poor aging resistance, rapid graying of the label surfaces due to plasticizer migration and problems in printing and punching of the labels owing to pulling of fibers by the adhesives.

The disadvantages arising during the processing of solvent-containing adhesives can often be avoided by using aqueous polymer dispersions, in particular polyacrylate dispersions. Aqueous contact adhesive dispersions are therefore being increasingly used for the production of self-adhesive articles, including those having polyolefinic substrates.

Such dispersions, in particular those of conventional soft and tacky acrylate copolymers having glass transition temperatures of less than −10° C., as disclosed in, for example, U.S. Pat. No. 4,371,659 or DE-A No. 2459160, have good to excellent adhesion on polar surfaces but not on nonpolar surfaces, in contrast to polyolefins. Although this problem can be solved for adhesive substrates in most cases by conventional industrial measures, for example corona discharge pretreatment, flame treatment or chemical pretreatment, this is impossible in practice for a nonpolar surface to which, for example, a self-adhesive label is to be stuck. The result is generally poor adhesion of the self-adhesion article to nonpolar surfaces.

Another possible method of improving the adhesion to polyolefinic adhesive substrates is to use polyacrylate dispersions which contain a carbonyl-containing comonomer and water-soluble dihydrazine compounds, as disclosed in DE-A No. 3319240. The contact adhesive dispersions thus obtained and the self-adhesive articles produced from them have outstanding adhesion of the contact adhesive layer to the substrate but the peeling strength of the self-adhesive article at high shear strength is poor, particularly on polyolefin surfaces.

Although mixing the contact adhesive dispersion with soft resin dispersions (tackifiers) somewhat improves the tack with respect to polyethylene, the adhesion of such dispersions to polyethylene is insufficient. Even when the said contact adhesive dispersion is mixed with resin dispersions, the adhesion to polyolefin surfaces is always particularly poor when the polyacrylate dispersion used is predominantly derived from monomeric acrylates of alkanols of less than 8 carbon atoms.

We have found that 40–70% strength by weight aqueous dispersions of nontertiary butyl (meth)acrylate copolymers having glass transition temperatures of less than −10° C., which contain conventional anionic and, if required, also nonionic emulsifiers have particularly good adhesive properties fi the copolymers contain, as copolymerized units, (a) from 70 to 85% by weight of nontertiary butyl (meth)acrylates,
(b) from 8 to 27.2% by weight of (meth)acrylates (A) whose homopolymers have a glass transition temperature greater than that of the polybutyl (meth)acrylate up to 0° C. and (meth)acrylates (B) whose homopolymers have a glass transition temperature below that of the polybutyl (meth)acrylate, the weight ratio of the (meth)acrylates (A) to the (meth)acrylates (B) being from 3:1 to 1:3,
(c) from 2 to 15% by weight of methyl methacrylate, styrene and/or acrylonitrile and
(d) from 0.8 to 5% by weight of monoolefinically unsaturated mono- and/or dicarboxylic acids of 3 to 5 carbon atoms and/or their amides which are unsubstituted or substituted at the nitrogen atoms by alkyl and/or alkylol radicals of 1 to 4 carbon atoms and/or hydroxyalkyl (meth)acrylates where the alkyl groups are of 2 to 5 carbon atoms.

The novel poly(meth)acrylate dispersions are particularly suitable for coating sheet-like substrates, for example paper labels and plastic labels. After modification with resin dispersions, the film produced from the mixtures have a very good peeling strength and high tack on virtually all materials, including polyolefinic ones, and good cohesion. The copolymerization of such monomers, whose polymers have various glass transition temperatures, results in surprisingly good adhesion to polyolefin surfaces. This is an advantage in comparison with the known contact adhesives for labels.

In particular, the fast grab on polyethylene, which results in immediate adhesion of the self-adhesive article to polyethylene, even after a very short contact time, is very good.

The novel aqueous butyl (meth)acrylate copolymer dispersions can be prepared in a conventional manner by copolymerization of the monomers in aqueous emulsion using conventional emulsifiers and dispersants and have a concentration of from 40 to 70, preferably from 55 to 65, % by weight of copolymer. They generally contain, as emulsifiers and dispersants, from 0.2 to 3, preferably from 0.8 to 1.5, % by weight, based on the amount of the copolymer, of anionic and, if required, also nonionic emulsifiers, such as sodium dialkylsulfosuccinates, sodium salts of sulfated oils, sodium salts of alkylsulfonic acids, sodium alkylsulfates, potassium alkylsulfates and ammonium alkylsulfates, alkali metal salts of sulfonic acids, alkali metal salts of oxyalkylated $C_{12}C_{24}$-fatty alcohols and of oxyalkylated alkylphenols and polyadducts of alkylene oxides, such as ehtylene oxide and/or propylene oxide, with fatty acids, fatty alcohols, fatty amides and/or alkylphenols having in general from 10 to 50 alkylene oxide, in particular ethylene oxide, radicals, and also sodium salts of fatty acids, such as sodium stearate and sodium oleate.

The aqueous dispersions of the claimed type can be prepared by the conventional processes of emulsion polymerization, batchwise or continuously, by copolymerization of the monomers in aqueous emulsion. The conventional water-soluble free radical polymerization initiators, in particular peroxides, e.g. sodium perioxide, potassium peroxide and ammonium peroxide, hydrogen peroxide and perborates can be used in conventional amounts, in general from 0.5 to 1, preferably from 0.2 to 0.5, % by weight, based on the monomers. The polymerization is carried out in general at from 50 to 100° C., preferably from 80 to 95° C.

When a reducing coinitiator, such as ascorbic acid or, in particular, sodium formaldehyde sulfoxylate, is concomitantly used, the emulsion polymerization can be carried out at from 40 to 60° C.

In the preparation of the claimed copolymers, it is also possible to use reducing regulators, and the amount of regulators may be from 0.01 to 0.1% by weight, based on the copolymer. Examples of suitable regulators are mercaptans, such as tert-butyl mercaptan and dodecyl mercaptan.

The feed method, in which some of the monomers, in general from 1 to 10% by weight, in a mixture of water, emulsifier and polymerization initiator is initially taken and the remainder of the monomers and the regulator are added at the polymerization temperature in emulsified form at the rate at which the polymerization proceeds, and in addition an aqueous solution of further polymerization initiator is introduced, has proven particularly suitable for the preparation of the novel dispersions. In this procedure, the composition of the initially taken monomer mixture may be identical to or different from the monomer composition of the feed.

The claimed copolymers have a glass transition temperature of less than -10° C., and the glass transition temperature can be determined by a conventional method, for example by measuring the modulus of elasticity in the tensile, flexural or compression test according to DIN 53,457 as a function of the temperature, or by differential thermal analysis.

The copolymers of the novel dispersions contain, as principal monomers (a) n-butyl acrylate, isobutyl acrylate and/or isobutyl methacrylate as copolymerized units.

Some of the monomers (b) give homopolymers having a glass transition temperature which is greater than the glass transition temperature of the monomer (a) used, up to 0° C. [(meth)acrylates (A)], when they are polymerized by themselves, while other monomers (b) give homopolymers whose glass transition temperature is below the glass transition temperature of the homopolymer of the monomer (a) used [(meth)acrylates (B)]; a weight ratio of the (meth)acrylates (A) to the (meth)acrylates (B) of from 3:1 to 1:3, in particular about equal amounts of the (meth)acrylates (A) and the (meth)acrylates (B), is of particular interest. A particularly suitable (meth)acrylate (A) is ethyl acrylate and particularly suitable (meth)acrylates (B) are 2-ethylhexyl acrylate, n-octyl acrylate and n-octyl methacrylate.

Methyl methacrylate is a preferred monomer (c) for the preparation of the novel copolymer dispersions, amounts of from 3 to 7% by weight, based on the copolymer, being of particular interest.

Particularly suitable monomers (d) are acrylic acid, methacrylic acid, itaconic acid, fumaric acid, maleic acid, acrylamide, methacrylamide, N-methylacrylamide and -methacrylamide, N-isopropylacrylamide, N-n-butylmethacrylamide, N-methylolacrylamide and -methacrylamide, 2-hydroxyethyl acrylate, 2-hydroxypropyl acrylate and 4-hydroxybutyl acrylate. Particularly interesting monomers (d) are acrylic and methacrylic acid, if necessary as a mixture with their amides.

The novel contact adhesive dispersions may contain, for example, conventional amounts of thickeners, plasticizers, tackifying resins and/or pigments as additives. The contact adhesives may be applied to one or both sides of the substrates in a conventional manner, by spraying, knife-coating, pouring, application with a hard or soft roller or immersion. Indirect application of the contact adhesives, for example by the transfer method using a siliconized paper, is also possible. After application of the adhesives, the coated substrates are dried in a conventional manner.

The novel butyl (meth)acrylate copolymer dispersions can be used for the production of self-adhesive labels or other self-adhesive articles. Suitable substrates are films of polyethylene, polypropylene, polyethylene glycol terephthalate, PVC and metal and paper.

In the Example which follow, in order to test the performance characteristics the dispersions or their mixtures are applied by means of a knife coater in a weight of about 20 g/m² to commercial 35 μm thick polyester film and the coated films are dried for 3 minutes at 90° C. in a through-circulation drier. The coated films are covered with a siliconized protective paper and then cut into 2 cm wide test strips.

To determine the shear strength, 2.5 cm long adhesive strips are stuck to a V2A stainless steel sheet, stored for 24 hours and then loaded by suspending a 1 kg weight. The measure of the shear strength is the time taken for the weight to fall down; the average of 5 measurements is used for this purpose. In this test, the adhesive layer should as far as possible be destroyed (loss of cohesion). The test is carried out at room temperature (23° C., 50% relative humidity) and at 50° C. (through-circulation drier).

In the determination of the peeling strength, the adhesive strip is stuck to a V2A stainless steel test sheet, stored if necessary, and peeled off in a tensile strength tester at 23° C. at an angle of 180° C. and at a speed of 75 mm/min. The measure of the peeling strength is the force, in N, which is obtained as the mean value of 5 tests. In the peeling test, the adhesive layer should not be destroyed and should separate completely from the substrate (loss of adhesion).

In the determination of the loop value, an adhesive strip is clamped by both ends in the upper jaws of the tensile strength tester in such a way that it forms a loop with the coated side facing outward. This loop is moved at 300 mm/minute toward the test surface (V2A stainless steel or polyethylene) until the loop rests against the test surface under its own weight. The loop resting against the surface is peeled off again at 300 mm/minute. The measure of the loop value is the force, in N, which is obtained as the average of 5 measurements. In the loop value test, the adhesive layer should not be destroyed and should separate completely from the substrate (loss of adhesion).

The grab on polyethylene is determined by qualitative evaluation of the grab of an adhesive strip which is formed into a loop and brought rapidly by hand toward a polyethylene substrate, so that, similarly to the test for the loop value, the adhesive strip rests against the test surface under its own weight, and is then peeled off again. The ratings for the evaluation have the following specific meanings:

4 = no adhesion to the substrate
3 = very little adhesion to the substrate
2 = good adhesion to the substrate; the major part of the contact area of the strip adheres to the test surface
1 = very good adhesion; the entire area of the strip adheres to the test surface.

In the Examples which follow, parts and percentages are by weight. Preparation of the polymer dispersions 150 parts of water are initially taken in a reaction vessel equipped with a stirrer and 2 feed vessels. A feed vessel 1 with a stirrer contains 600 parts of monomer according to Table 1, emulsified in 150 parts of water (feed 1). 1% (based on the monomers) of sodium di(ethylhexyl) sulfosuccinate is used as the emulsifier.

A second feed vessel contains 0.3% (based on the monomers) of sodium peroxodisulfate (Examples 1-3) or potassium peroxodisulfate (Examples 4-6) in 100 parts of water (feed 2).

The initially taken mixture is heated to 85° C. and 1% of feed 1 and 20% of feed 2 are added while stirring. After initial polymerization for 15 minutes, the 2 feeds are added in the course of 3 hours. The rate of addition of individual feeds can be varied within the time of addition. Polymerization is continued for about a further hour at 85° C., after which the mixture is cooled.

It is then neutralized with, for example, a 25% strength ammonia solution.

TABLE 1

EXAMPLES 1 TO 6 AND COMPARATIVE EXPERIMENTS a TO d

| Example No. | Monomer composition (% by weight) | | | | | | |
|---|---|---|---|---|---|---|---|
| | BA | EHA | EA | MMA | MA | S | AS |
| 1 | 80 | 6 | 3 | 9 | — | — | 2 |
| 2 | 85 | 5 | 7 | 2 | — | — | 1 |
| 3 | 70 | 9 | 9 | — | 6 | 5 | 1 |
| 4 | 83 | 5 | 6 | 4 | — | — | 2 |
| 5 | 77 | 4 | 10 | 8 | — | — | 1 |
| 6 | 82 | 7 | 4 | — | — | 6 | 1 |
| Comparative Experiments | | | | | | | |
| a | 96 | 2 | — | 1 | — | — | 1 |
| b | 96 | 2 | — | 2 | — | — | — |
| c | 60 | 9 | 20 | — | — | 10 | 1 |
| d | 10 | 78 | 1.5 | 8 | — | 2 | 0.5 |

BA = n-butyl acrylate
EHA = ethylhexyl acrylate
EA = ethyl acrylate
MMA = methyl methacrylate
MA = methyl acrylate
S = styrene
AS = acrylic acid

TABLE 2

Testing of performance characteristics of the dispersions from Table 1

| Example No. | Peeling strength immediate (N/2 cm) | Cohesion (RT) (min) | Loop value on steel N/2 cm | Loop value on polyethylene N/2 cm | Grab on polyethylene |
|---|---|---|---|---|---|
| 1 | 11.7 | 482 | 9.1 A/K | 2.3 A | 2 |
| 2 | 10.8 A/K | 413 | 8.9 A | 1.9 A | 2-3 |
| 3 | 8.9 A | 673 | 6.7 A | 2.0 A | 3 |
| 4 | 12.5 | 294 | 11.4 | 2.5 A | 2 |
| 5 | 11.9 | 286 | 10.8 | 1.8 A | 2-3 |
| 6 | 8.5 A | 738 | 6.3 A | 2.1 A | 2 |
| Comparative Experiment | | | | | |
| a | 5.2 A | 1517 | 6.1 A | 0.9 A | 4 |
| b | 5.4 A | 1395 | 6.2 A | 0.7 A | 3-4 |
| c | 4.9 A | 320 | 5.2 A | 1.3 A | 3-4 |
| d | 11.1 A | 91 | 5.3 A | 1.8 A | 3 |

Parting characteristics (unless stated otherwise): loss of cohesion
A = loss of adhesion
A/K = no clear parting characteristics

TABLE 3

Testing the performance characteristics of the dispersions from Table 1 as a ixture with soft resin dispersion ( ®Snowtack 301 CF; polymer/resin = 2:1 solid/solid):

| Example No. | Peeling strength immediate (N/2 cm) | Cohesion (min) | Loop value on steel N/2 cm | Loop value on polyethylene N/2 cm | Grab on polyethylene |
|---|---|---|---|---|---|
| 1 | 15.1 | 176 | 13.8 A/K | 4.4 A | 1-2 |
| 2 | 14.8 A/K | 185 | 13.1 A | 4.1 A | 2 |
| 3 | 12.1 A | 227 | 7.0 A | 2.9 A | 2 |
| 4 | 16.2 | 150 | 15.1 | 4.8 A | 1-2 |
| 5 | 15.8 | 147 | 13.7 | 3.4 A | 1-2 |
| 6 | 11.7 A/K | 243 | 9.7 A | 4.4 A | 1-2 |
| Comparative Experiment | | | | | |
| a | 8.3 A | 925 | 8.9 A | 2.1 A | 3 |
| b | 8.2 A | 812 | 9.0 A | 1.9 A | 2-3 |
| c | 7.3 A | 197 | 6.5 A | 1.7 A | 3 |
| d | 13.9 A | 28 | 8.8 A | 2.2 A | 2.3 |

Parting characteristics (unless stated otherwise): loss of cohesion
A = loss of adhesion
A/K = no clear parting characteristics

We claim:
1. A 40-70% strength aqueous dispersion of nontertiary butyl (meth)acrylate copolymers having glass transition temperatures of less than −10° C., which contain conventional anionic emulsifiers, wherein the copolymers contain, as copolymerized units,
    (a) from 70 to 85% by weight of nontertiary butyl (meth)acrylates,
    (b) from 8 to 27.2% by weight of (meth)acrylates (A) whose homopolymers have a glass transition temperature greater than that of the polybutyl (meth)acrylate up to 0° C. and (meth)acrylates (B) whose homopolymers have a glass transition temperature below that of the polybutyl (meth)acrylate, the weight ratio of the (meth)acrylates (A) to the (meth)acrylates (B) being from 3:1 to 1:3,
    (c) from 2 to 15% by weight of methyl methacrylate, styrene and/or acrylonitrile and
    (d) from 0.8 to 5% by weight of monoolefinically unsaturated mono- and/or dicarboxylic acids of 3 to 5 carbon atoms and/or their amides which are unsubstituted or substituted at the nitrogen atoms by alkyl and/or alkylol radicals of 1 to 4 carbon atoms and/or hydroxyalkyl (meth)acrylates where the alkyl groups are of 2 to 5 carbon atoms.
2. The aqueous dispersion of claim 1, wherein
    (a) is n-butyl acrylate, isobutyl acrylate and/or isobutyl methacrylate,
    (A) is ethyl acrylate,
    (B) is 2-ethylhexyl acrylate, n-octyl acrylate or n-octyl methacrylate,
    (c) is methyl methacrylate, and
    (d) is acrylic acid, methacrylic acid, itaconic acid, fumaric acid, maleic acid, acrylamide, methacrylamide, N-methylacrylamide, N-methylmethacrylamide, N-isopropylacrylamide, N-n-butylmethacrylamide, N-methylolacrylamide, N-methylolmethacrylamide, 2-hydroxyethyl acrylate, 2-hydroxypropyl acrylate or 4-hydroxybutyl acrylate.

* * * * *

UNITED STATES PATENT AND TRADEMARK OFFICE
CERTIFICATE OF CORRECTION

PATENT NO. : 4,937,282
DATED : JUNE 26, 1990
INVENTOR(S) : PETER PFOEHLER ET AL.

It is certified that error appears in the above-identified patent and that said Letters Patent is hereby corrected as shown below:

On the title page

In the inventor, delete "Vietmeter" and insert --Vietmeier--.

Signed and Sealed this

Seventeenth Day of September, 1991

*Attest:*

HARRY F. MANBECK, JR.

*Attesting Officer*  *Commissioner of Patents and Trademarks*